United States Patent
Chu et al.

(10) Patent No.: US 7,194,008 B2
(45) Date of Patent: Mar. 20, 2007

(54) METHOD AND APPARATUS FOR PARSING DATA STREAMS

(75) Inventors: Ngok Ying Chu, San Jose, CA (US); John M. Chiang, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 1098 days.

(21) Appl. No.: 10/238,805

(22) Filed: Sep. 11, 2002

(65) Prior Publication Data
US 2003/0174727 A1    Sep. 18, 2003

Related U.S. Application Data

(60) Provisional application No. 60/364,052, filed on Mar. 15, 2002.

(51) Int. Cl.
*H04J 3/06*    (2006.01)
(52) U.S. Cl. ........................................ 370/465; 370/503
(58) Field of Classification Search .................... None
See application file for complete search history.

(56) References Cited

U.S. PATENT DOCUMENTS

| | | | | |
|---|---|---|---|---|
| 3,750,107 | A * | 7/1973 | Pyne ............................. | 370/465 |
| 4,490,819 | A * | 12/1984 | Bogan et al. ................... | 370/465 |
| 4,858,232 | A * | 8/1989 | Diaz et al. ..................... | 370/465 |
| 5,390,173 | A | 2/1995 | Spinney et al. ................ | 370/60 |
| 5,781,549 | A | 7/1998 | Dai .............................. | 370/398 |
| 6,104,696 | A | 8/2000 | Kadambi et al. .............. | 370/218 |
| 6,247,073 | B1 * | 6/2001 | Takeda ........................ | 710/61 |
| 6,556,589 | B2 * | 4/2003 | McRobert et al. ........... | 370/501 |
| 6,744,782 | B1 * | 6/2004 | Itakura et al. ............... | 370/466 |

OTHER PUBLICATIONS

Richard Cam and Russ Tuck, "System Packet Interface Level 4 (SPI-4) Phase 2: OC-192 System Interface for Physical and Link Layer Devices," Implementation Agreement: OIF-SP14-02.0, Optical Internetworking Forum, Jan. 2001, pp. 1-64.
Ron DiGiuseppe—XP-002369303, "Virtex-II Platform FPGAs Support System Packet Interface Standards for Optical Networks", Summer 2001, pp. 50-52.
Richard Cam and Russ Tuck—XP-002299896, "System Packet Interface Level 4 (SPI-4) Phase 2: OC-192 System Interface for Physical and Link Layer Devices", Jan. 2001, pp. 1-64.

* cited by examiner

*Primary Examiner*—Chau Nguyen
*Assistant Examiner*—Jordan Hamann
(74) *Attorney, Agent, or Firm*—Squire, Sanders & Dempsey L.L.P.

(57) ABSTRACT

A system includes an interface, a synchronization module, a pre-filtering module and a data alignment module. The interface is configured to connect a first device having a first transfer rate and a second device having a second transfer rate. The interface transfers a data stream from the first device to the second device. The synchronization module is provided within the second device and is configured to synchronize the first transfer rate and the second transfer rate. The pre-filtering module is connected to the synchronization module, and the pre-filtering module is configured to mask a non-compliant input within the data stream into a compliant output. The data alignment module is connected to the pre-filtering module, and the data alignment module is configured to perform logic computations on the legal output.

20 Claims, 8 Drawing Sheets

METHOD AND APPARATUS FOR PARSING DATA STREAMS

REFERENCE TO RELATED APPLICATION

This application claims priority of U.S. Provisional Patent Application Ser. No. 60/364,052, which was filed on Mar. 15, 2002. The subject matter of the earlier filed application is hereby incorporated by reference.

BACKGROUND OF THE INVENTION

1. Field of the Invention

This invention relates to a system and method for generating a key to filter and mask non-compliant input combinations to render compliant output combinations.

2. Description of the Related Art

In recent years, the unprecedented demands for faster operating electronic devices have placed a greater demand on the operating components of current electronic devices, which may operate at a lower rate. Some of these slower devices may need to interface with these faster state-of-the-art electronic devices. As a result of the speed mismatch between the logic designs of the faster devices and the slower devices, a timing difference between the interfaces of two such electronic devices may develop. This timing difference may render the compatibility and exchange of data between two such devices more difficult to achieve.

Accordingly, new and improved systems and methods for interfacing two devices having mismatched speed rates are needed.

SUMMARY OF THE INVENTION

According to an embodiment of the invention, provided is a network component within a network entity. The network component includes a port, a synchronization module, a pre-filtering module and a data alignment module. The port is connected to the network entity and is configured to send and receive a data stream having a first transfer rate. The synchronization module is connected to the port and is configured to synchronize the first transfer rate and a second transfer rate. The pre-filtering module is connected to the synchronization module and is configured to mask a non-compliant input within the data stream into a compliant output. The data alignment module is connected to the pre-filtering module and is configured to perform logic computations on the compliant output.

According to another embodiment of the invention, provided is a network component within a network entity. The network component includes a port, synchronization means, a pre-filtering means, and a data alignment means. The port is connected to the network entity and configured to send and receive a data stream having a first transfer rate. The synchronization means is connected to the port and is for synchronizing the first transfer rate and a second transfer rate. The pre-filtering means is connected to the synchronization module and is for masking a non-compliant input within the data stream into a compliant output. The data alignment means is connected to the pre-filtering means and is for performing logic computations on the compliant output.

According to another embodiment of the invention, provided is a method for filtering non-compliant logic combinations within a system. The method includes a step of interfacing a first device having a first transfer rate and a second device having a second transfer rate. The method also includes a step of transferring a data stream from the first device to the second device. The method further includes the step of synchronizing the first transfer rate and the second transfer rate. The method includes the step of masking a non-compliant input within the data stream into a compliant output. The method also includes the step of performing logic computations on the complaint output.

BRIEF DESCRIPTION OF THE DRAWINGS

The objects and features of the invention will be more readily understood with reference to the following description and the attached drawings, wherein.

DETAILED DESCRIPTION OF THE PREFERRED EMBODIMENTS

The invention relates to, according to one embodiment, a method and apparatus for interfacing two devices having mismatched rates by pre-filtering illegal combinations upstream of a data alignment circuit.

Figure 1:
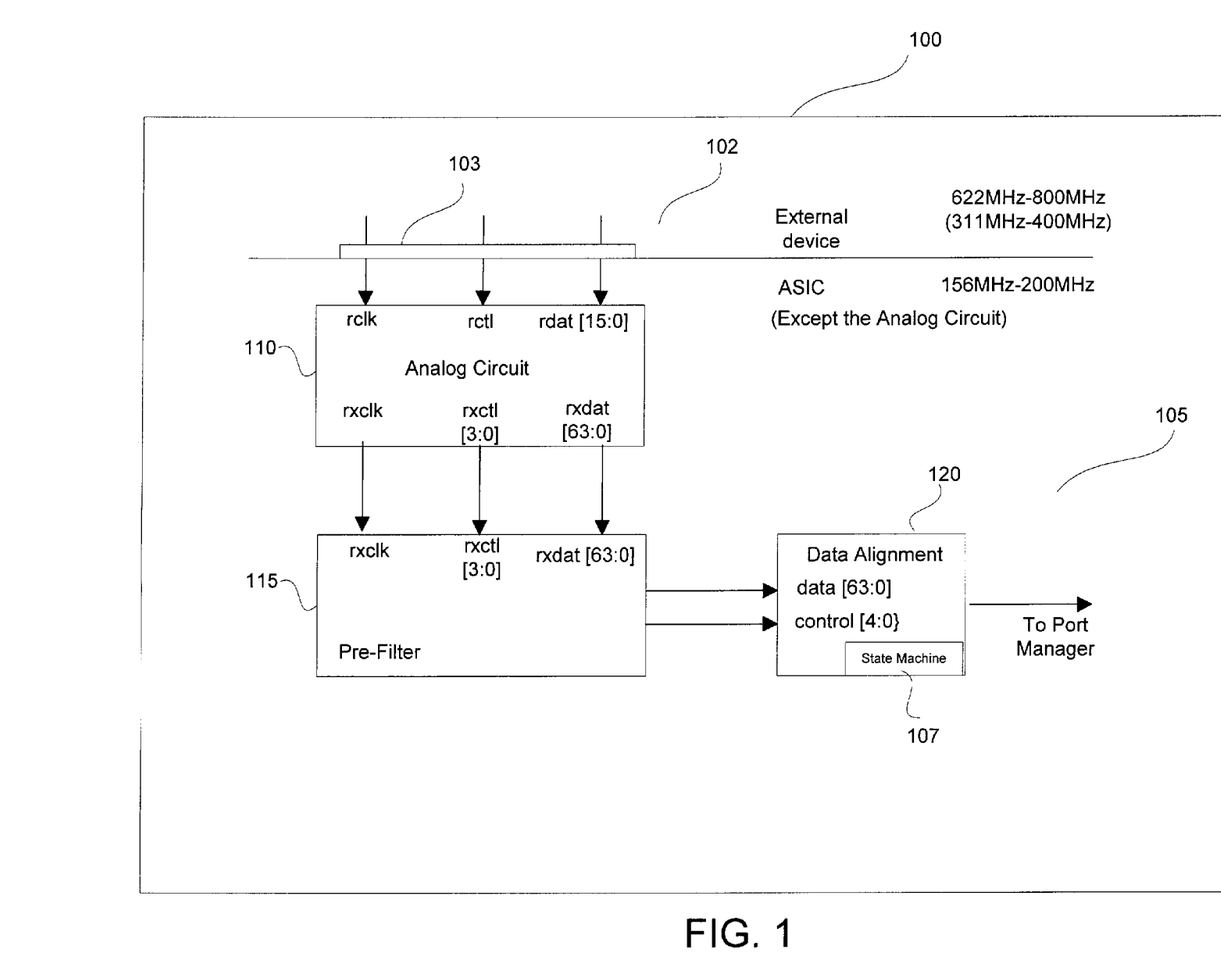
FIG. 1 is a block diagram of a system according to an embodiment of the invention.

As discussed above, in electronic devices, which connect to other devices, there are many chips that may operate at different clock speeds. For example, an external chip may operate at two times, three times, four times or virtually any multiple of the speed of an internal chip to which the external chip connects to and communicates with. For instance, as shown in FIG. 1, system 100 may include an interface between an external device 102 and an internal device 105. The interface may be a SPI-4 (System Packet Interface Level 4 Phase 2: OC-192 System Interface for Physical and Link Layer Devices) interface. SPI-4 may be an interface for packet and cell transfer between a physical layer (PHY) device and a link layer device, for aggregate bandwidths of OC-192 ATM and Packet over SONET/SDH (POS), as well as 10 Gb/s Ethernet applications. The SPI-4 interface 103, in this example, may operate at a speed ranging from 622 MHz to 800 MHz. Thus, the clock rate may be half of the data rate (311 MHz 400 MHz) as shown in FIG. 1. However, the clock speed within internal device 105 may not be able to achieve the clock speed of the external device. The components of internal device 105 may be an ASIC (Application-Specific Integrated Circuit). Therefore, a circuit designer may increase the width of the internal data bus, which serves as a common pathway or channel between the internal and external device, to compensate for the clock speed. According to the embodiment as shown in FIG. 1, the internal bus width may be expanded to be four times the width of the external bus size. Increasing the internal data bus increases the processing power of the internal chip. However, increasing the internal data bus creates another problem in the logic design.

Increasing the width of data paths allows more bits of data to be processed per cycle. However, with conventional chip designs, simply increasing the width of the data path may also require larger registers and more complex arithmetic logic units (ALUs). As a result, a larger and more complicated chip may be required to handle the complex arithmetic computations. For instance, if a device includes a state machine, which is a sequential logic system, increasing the width of the data paths may significantly increase the number of logic computations. A state machine is a sequential logic system which operates by determining the relationship between several inputs of the state machine inputs in order to determine the next output. Thus, the relationship between the inputs and the output of a state machine is a combinational calculation.

Therefore, increasing the data path of a device that includes, for example, a state machine increases the number of inputs that the state machine receives and the number of combinational calculations that the state machine has to perform. In a conventional device, the state machine may be required to process all possible logic combinations of the inputs although some of the combinations are illegal. If the state machine has to process all possible combinations of the input signals, these numerous computations may expend a lot of gate counts and may require the insertion of a longer pipeline gate in order to meet the speed requirement of external device 102. Therefore, the invention provides an apparatus and method to filter and correct illegal input or non-compliant combinations. Thus, the invention simplifies the design of the data alignment circuit 120 and state machine 107.

As shown in FIG. 1, the invention provides a method and apparatus so that external device 102 may interface with the internal device 105 so that both devices are capable of operating in a synchronized and coordinated manner. To achieve this interoperability between the external and internal device, internal device 105 may include an analog circuit 105, a pre-filter 115 and a data alignment circuit 120 to compensate for the differences in the internal logic designs of both devices.

FIG. 1 depicts the interface signals on the receiving side of internal device 105. The receive data paths for internal device 105 may include a clock signal (RCLK), a control signal (RCTL) and a data signal (RDAT). RCLK may be a clock signal associated with transmitting data signals and control signals between a PHY device and a link layer device. The data and control lines may be driven off the rising and falling edges of the clock signal. RDAT may carry the payload data and the control word from the PHY to the link layer device. In mapping the incoming signals, RCTL may be configured so that it is to a high position when a control word is present in RDAT. Otherwise, RCTL may be set to a low position.

Figure 2:
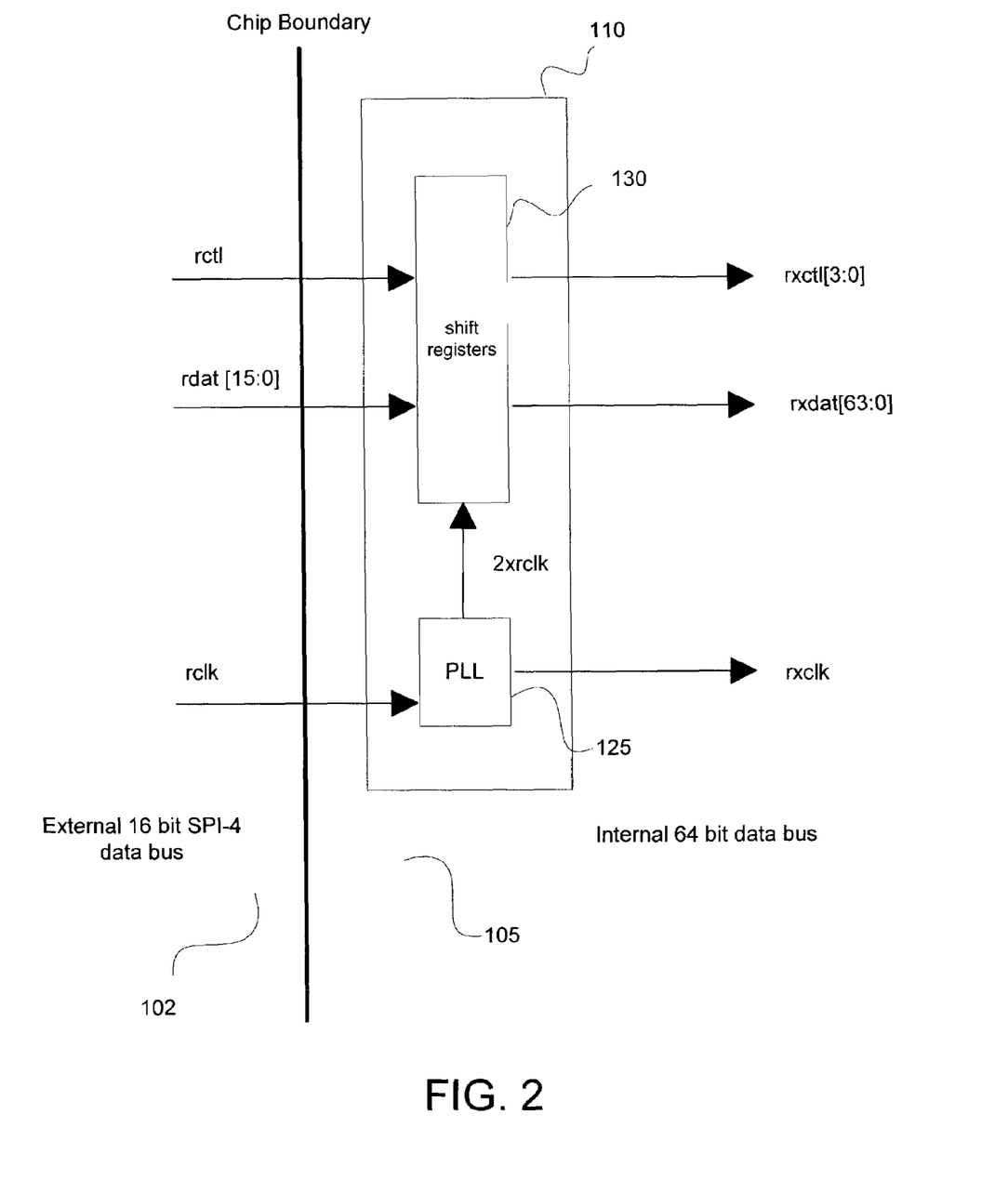
FIG. 2 is a block diagram of a chip boundary according to an embodiment of the invention.

FIG. 2 provides a further detailed illustration of the interface at internal device 105, which may be a chip. Analog circuit 110 may include a phase locked loop (PLL) 125 and shift registers 130. At the chip boundary as shown in FIG. 2, as the data stream arrives, RCLK may be fed into the PLL. RDAT, which includes 16-bits data signal, and RCTL, which includes 4-bits control signal, may be transferred into the shift registers 130 of analog circuit 110.

Figure 3A:
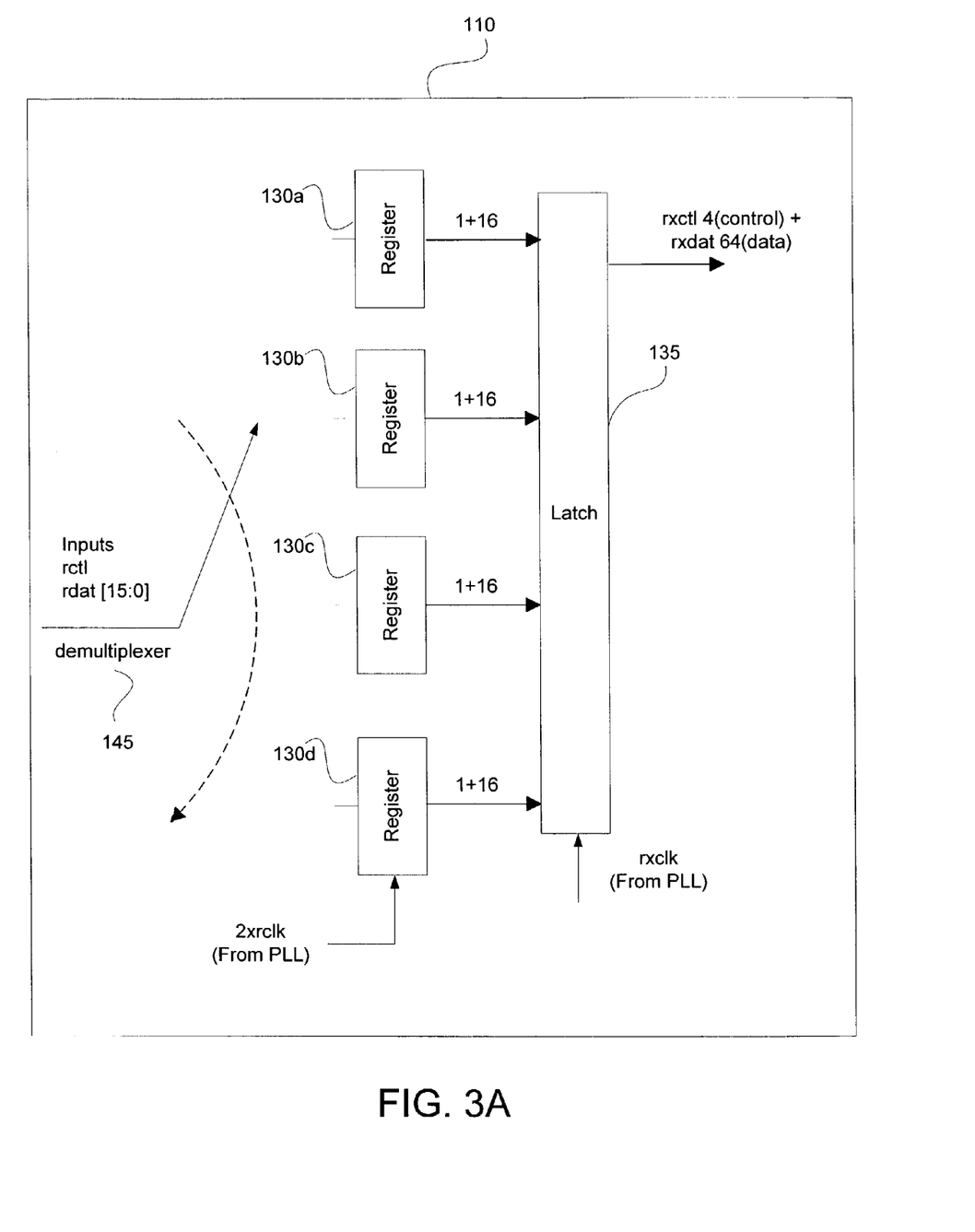
FIGS. 3A–3B illustrate the timing relationship between an internal bus and an external bus according to an embodiment of the invention.
Figure 3B:
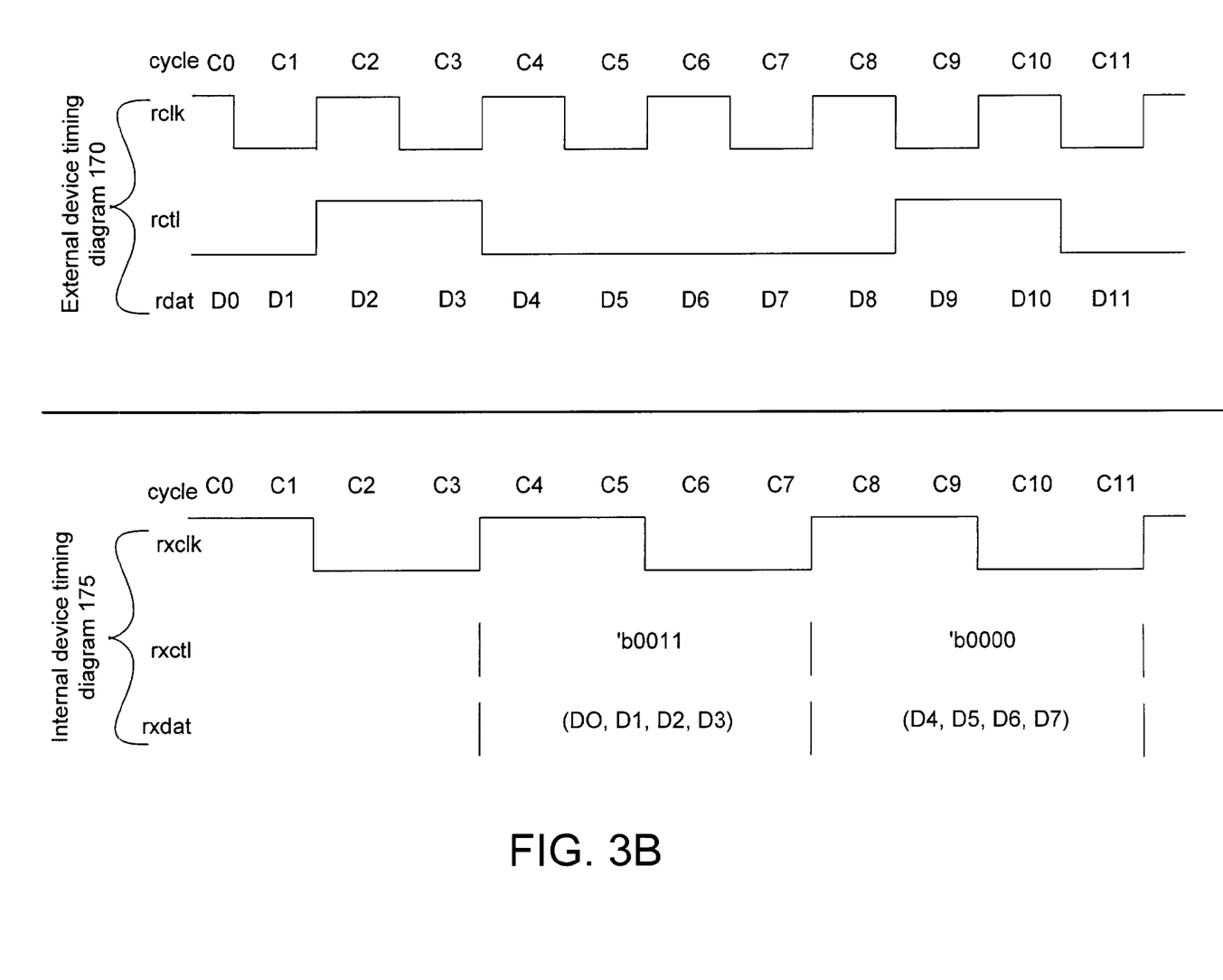

FIGS. 2–3 illustrate how the external 16-bits data bus arrives into chip 110 may be converted into a 64-bits data bus. PLL 125 or some other frequency multiplication circuit may be used to generate the faster frequency clock for the slower system clock of internal device 105. In order for the internal and external devices to synchronously communicate with each other, they need to know the cycle time relationship between their respective clocks and the clocks on the devices that they are communicating to. FIGS. 3A–3B shows the timing relationship between the internal and external devices. In FIG. 3A, analog circuit 110 may include a demultiplexer 145, which directs the incoming bits of the data stream from the external device to one of several registers 130$a$–$d$. For example, in FIG. 3A demultiplexer 145 directs the incoming data signal and control signals so that 16-bits of a data signal of RDAT and a 1-bit control signal for each clock cycle are directed to a respective shift register 130$a$–$d$. PLL 125 may lock onto the external clock signal RCLK and generate a clock signal for shift registers 130$a$–$d$ and latch 135 which will synchronize the internal and external devices. Shift registers 130$a$–$d$ may receive an input coupled to their signal line from PLL 125 so that the shift registers 130$a$–$d$ are clocked by a 2×CLK clock signal transmitted from PLL 125. The 2×CLK clock signal shifts each set of 16-bits data signals and 1-bit control word into and out of shift registers 130$a$–$d$. The clock signal 2×CLK transmitted from PLL 125 may be set at least twice the frequency of the clock, RCLK, of external device 102.

Each set of 17-bits (which includes 16-bits data signal and 1-bit control signal) from shift registers 130$a$–$d$ are then transmitted to a latch circuit 135. Another signal RXCLK may be transmitted by PLL 125 to latch circuit 135 to achieve synchronization of the external and internal device's clock signals. RXCLK, may be set to be equal to half of the speed of the external clock RCLK. The output of the latch 135 may be 4-bits control signal and 64-bits data signal, which are synchronized with the input data from external device 102.

FIG. 3B illustrates a timing diagram of the mapping of the 16-bits of the external device to the 64-bits of the internal device. The external device timing diagram 170 shows the receipt of the 16-bits data at internal device 105. To map the 16-bits to 64-bits, at the beginning of the c4 cycle of the internal device timing diagram 175, the invention may accumulate the data (D0, D1, D2, D3) from the previous four cycles (c0, c1, c2, c3) and output this grouping of data as the 64-bit data signal RXDAT (63:0) from latch 135 for the c4 clock period as shown in FIG. 3A. Similarly, for the c8 cycle in the internal timing diagram 175, the invention may accumulate the data (D4, D5, D6, D7) and output this grouping of 64-bits data as RXDAT for the c8 cycle in the internal device timing diagram 175.

The invention may also map the control signal from external device 102 to internal device 105. The mapping of the control signal, RXCTL, which corresponds to the c4 clock period may be noted by the term 'b0011, which is a syntax for a binary number which includes four data fields. The four data files indicate the position of control signal RCTL during cycles c1, c2, c3 and c4 as shown in the external device timing diagram 170 of FIG. 3B. The data fields of the term 'b0011 is generated by referring to the RCTL reference line of the external device timing diagram 170. As discussed above, in mapping the incoming signals, RCTL may be mapped to a high position when a control word is present, and RCTL may be mapped to a low position otherwise. For example in FIG. 3A, the RCTL for cycle c0 and c1 is "0", as indicated by the low position, and the RCTL for the c2 and c3 cycles are "1", as indicated by the high position. Therefore, the control signal from the external device to internal device maps to a binary number of 'b0011 as shown in the internal diagram timing diagram 175.

Therefore, the timing diagram illustrates how the invention may convert the 16-bits data input and the 1-bit control signal into an output of 64-bits data signal and 4-bits control signal.

Next, the 4 control signal and the 16 data signal are converted to a digital signal using an analog-to-digital converter (not shown), which may be a component of analog circuit 110. After converting the analog signals to a digital signal the digital signal is applied to pre-filter 115, as shown in FIG. 1.

Figure 5:
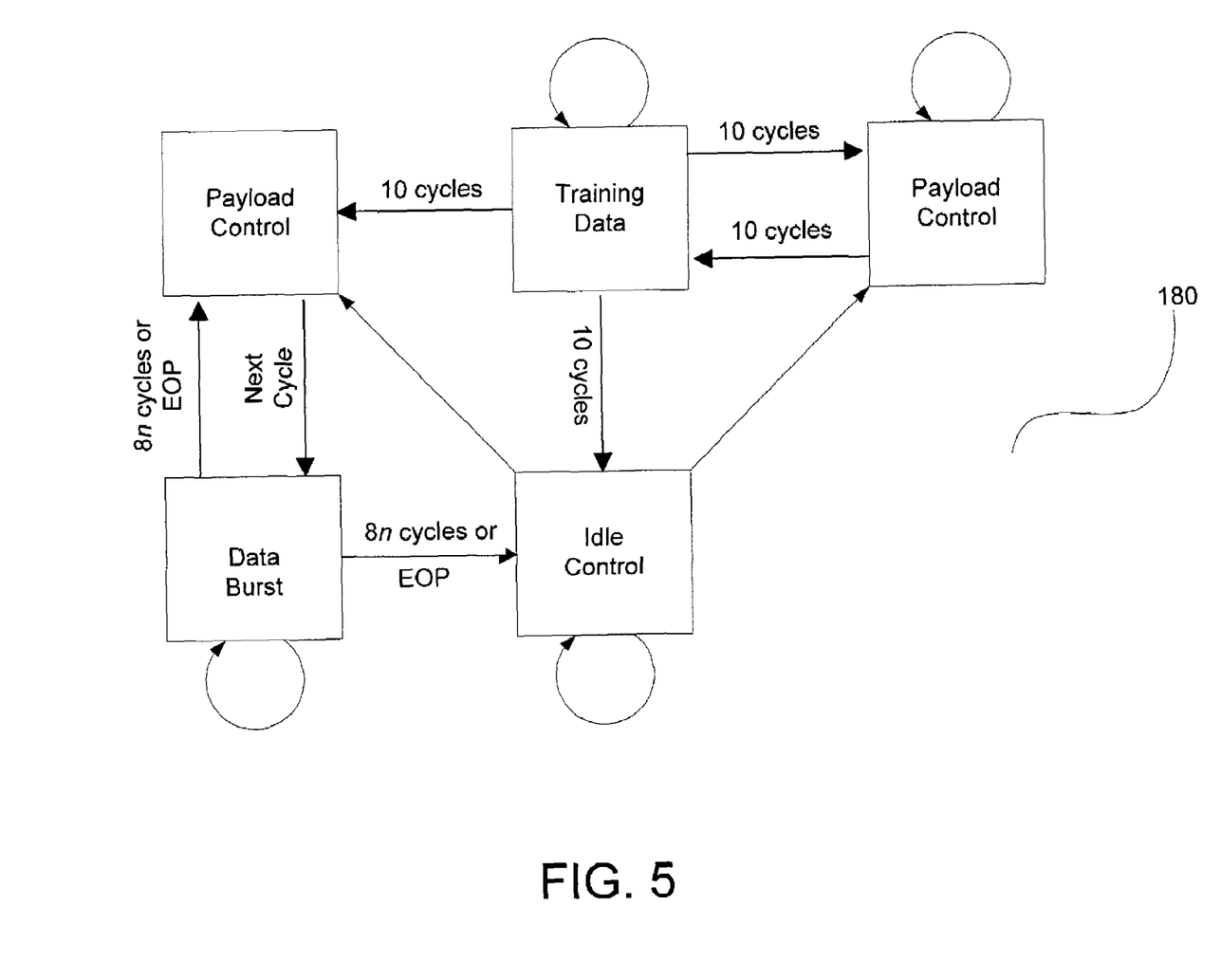
FIG. 5 depicts a state machine diagram which may be employed according to an embodiment of the invention.

As discussed above, the invention provides pre-filter 115 to remove the illegal input combinations that may occur during a data stream transmission from external device 102 to internal device 105. Pre-filter 115 eliminates the illegal input combinations that may occur, for example, within the 64-bits data signal and the 4-bits control signal, in order to simplify data alignment circuit 120 and to reduce the number of computations performed by state machine 107. State machine 107 may be integrated within data alignment circuit 120, or, alternately may be a separate and independent component, which communicates with data alignment circuit 120. As the data stream is being transferred from analog circuit 110 to pre-filter 115, pre-filter 115 monitors the sequential order of arrival of the data signals and the control signals and determines whether the order of arrival satisfies the operating parameters established for transmitting information between the internal and external devices. The operating parameters may be pre-defined by a system designer or according to the terms of a service level agreement (SLA) negotiated between the devices connected within system 100. Alternatively, the operating parameters may be negotiated and established dynamically as a device establishes a connection to and data streams flow in and out of system 100. The operating parameters may be mapped to correspond to state transitions within a state machine diagram 180, as shown in FIG. 5. State machine diagram 180 may be used to define the legal conditions or legal combinations based upon the operating parameters, which will be discussed below.

Figure 4:
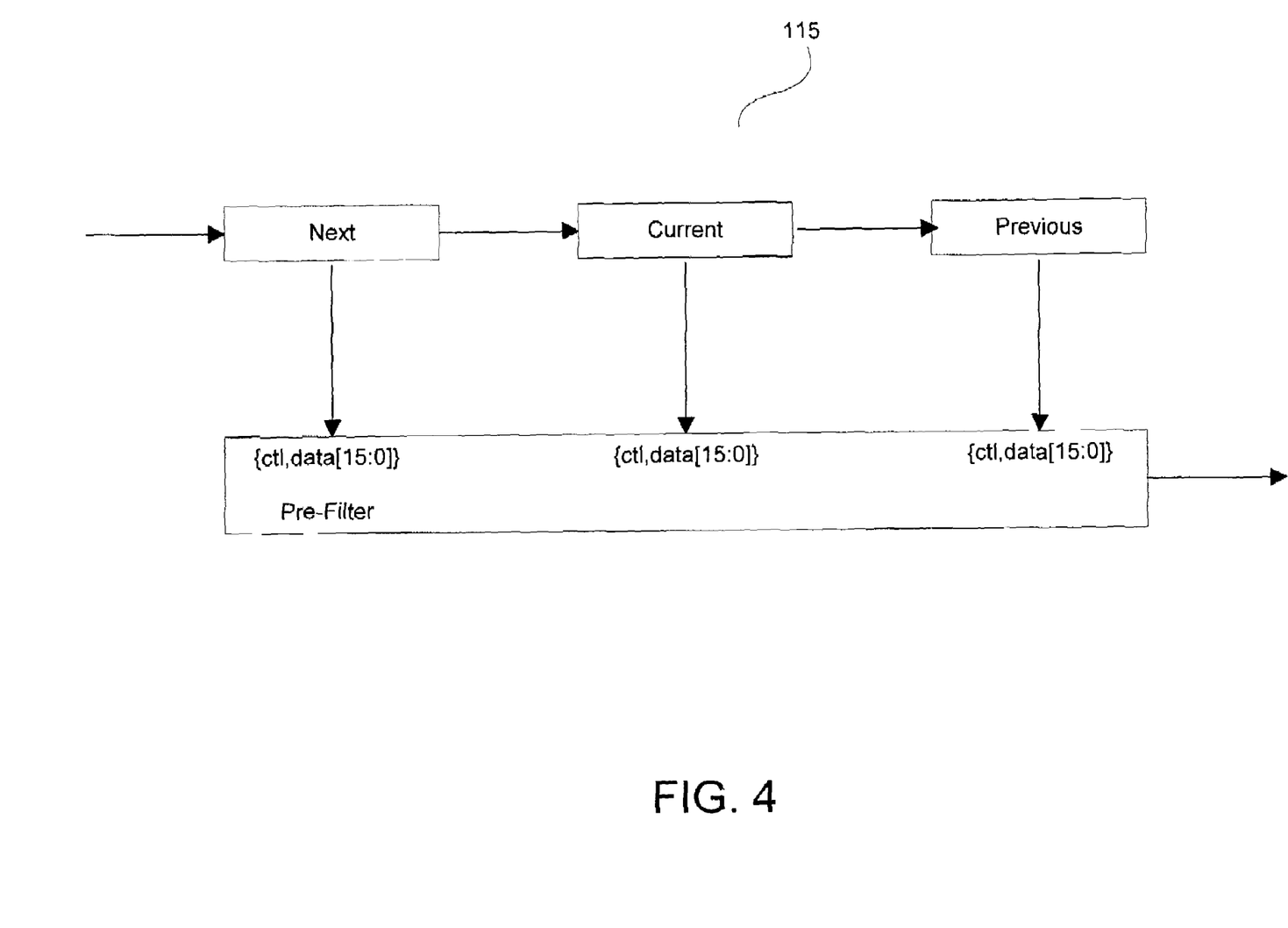
FIG. 4 shows a pre-filter that may be employed according to an embodiment of the invention.

Pre-filter 115 may operate to detect the order of arrival of the bits, and detect the arrival of an illegal combination. The incoming bits are sequentially transmitted within pre-filter 115 as shown in FIG. 4. To determine whether the sequence of bits is legal or illegal, pre-filter 115 determines the relationship between the inputs as they shift through pre-filter 115. Pre-filter 115 may include a three-input window that monitors and determines the identification of, for example, the previous 16-bits, the current 16-bits and the next 16-bits in order to determine whether the output value is a legal or illegal combination. If an illegal combination is detected, these illegal combinations are filter or masked by pre-filter 115 to generate a legal combination. Thus, the illegal bits are changed to render a legal combination.

The legal combinations, which define an acceptable order of arrival of the data signals and control signals, may be defined, for example, in state machine diagram, as shown in FIG. 5. FIG. 5 shows cycle-by-cycle behavior of the data path for valid 180 state transitions. To determine whether the sequential order of arrival for the incoming signals are legal or illegal, pre-filter 115 may follow the transition from one state to another state in FIG. 5. The states correspond to the type of words that may be transferred within the data path. The invention may be designed to receive several types of input, for example, as shown in TABLE I.

TABLE I

| Control word | control bit is activated |
|---|---|
| PCLW | payload control word |
| IC | idle control word |
| TCW | training control word |
| Data word | control bit is inactivated |
| TDW | training data word |
| Data | payload data |

For example, according to state diagram 180 of FIG. 5, transitions from the "Data Burst" state to "Payload Control" (if data is available for transfer) or "Idle Control" (otherwise) may be possible only on integer multiples of 8 cycles (corresponding to multiple of 16 byte segmentation) or upon an end-of-packet (EOP). The invention may also be configured so that a data burst must follow a payload control word immediately on the next cycle.

Figure 6:
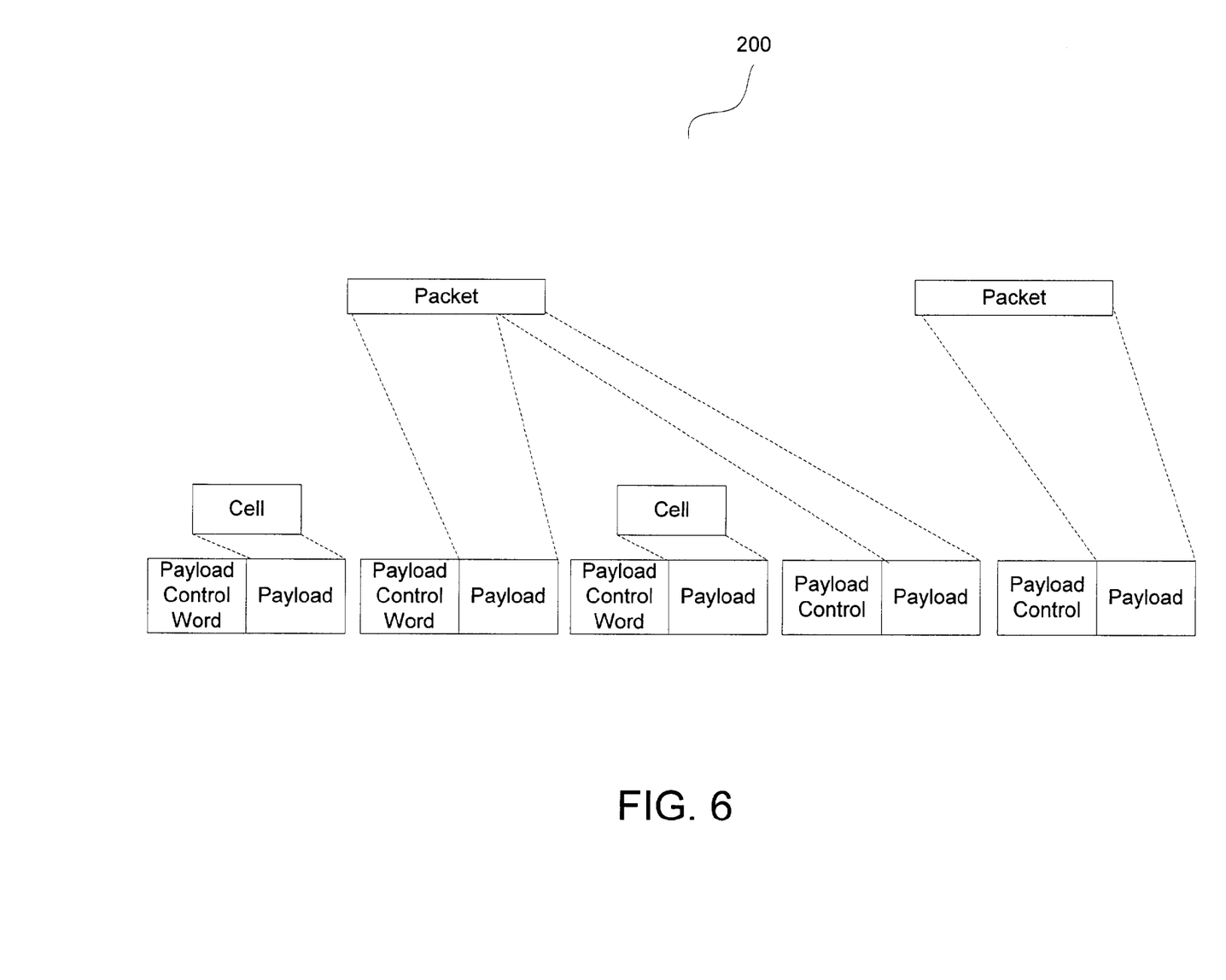
FIG. 6 illustrates a data stream that may be transmitted according to an embodiment of the invention.

The operating parameters may also be used to establish the data path format. For instance, in an embodiment of the invention that employs a SPI-4 interface, the data path may be configured in a data stream 200 so that complete packets or shorter bursts may be transferred, as shown in FIG. 6. FIG. 6 shows how ATM (Asynchronous Transfer Mode) cells and variable-length packets may be mapped onto the data stream. The data may be transferred in bursts that have a provisionable maximum length, with the exception of transfers that terminate with an end-of-packet. Transfers that occur at the end-of-packet may be of variable length. Information associated with each transfer such as port address, start or end-of-packet indication and error control coding may be transferred within a 16-bit control word. The maximum configured payload data transfer size may be established to be a multiple of 16 bytes. The system may be configured so that control words may be inserted only between burst transfers. Once a burst transfer has begun, data words may be sent uninterrupted until an end-of-packet or a multiple of 16 bytes is reached. The interval between the end of a given transfer and the next payload control word (marking the start of another transfer) may include one or more idle control words and training patterns.

The minimum and maximum supported packet lengths may be determined by the application. However, the invention may be configured so that successive start-of-packets may occur not less than 8 cycles apart, where a cycle may be defined to include one control or data word. The gap between shorter packets may be filled with idle control words. Furthermore, the training sequences of the training patterns may be established so that they are used by the receiving end of each interface for deskewing bit arrival times on the data and control lines. The training sequence may include one idle control word followed by one or more repetitions of a 20-word training pattern, which includes 10 (repeated) training control words and 10 (repeated) training data words. The initial idle control word may be used to remove dependencies of the parity bits in the training control words from preceding data words.

When pre-filter 115 receives a legal combination of inputs that conforms to the pre-established data format and/or arrival sequence, for example, as established in FIG. 5, pre-filter 115 may merely pass the legal combination there through and transmit the legal combination to data alignment circuit 120. However, if the sequential order of arrival of the bits in the data stream or the data path format does not meet the pre-defined transition states, for example, as shown in FIG. 5, then this is an illegal combination. If an illegal combination arrives at pre-filter 115, the invention determines how to change or mask the states of the illegal combination to render a legal combination. Thus, pre-filter 115 detects an illegal combination and maps an ordered sequence of input events into a corresponding sequence of legal or compliant output combinations.

Based upon the pre-determined format or transition state, the invention may generate a look-up table or key that may be used by pre-filter 115 to filter the illegal combination and substitute a legal combination as the output value. For example, a table such as TABLE II may be generated as a look-up table or key for state diagram 180 shown in FIG. 5. To determine the appropriate legal combination, the classification of the "current" input, the "next" input and/or "previous" input may be determined by pre-filter 115. Based upon these classifications, the invention may search for an appropriate legal output combination within look-up TABLE II and mask the current input to conform to the legal output combination.

TABLE II

| Next | Current | Previous | Output |
|------|---------|----------|--------|
| PLCW or IC | PLCW | X | IC |
| DATA | PLCW | X | PLCW |
| X | IC | X | IC |
| X | DATA | IC | IC |
| X | DATA | Not IC | DATA |

For example, in FIG. 5, when the current state is a "payload control" or PLCW, the input during the next cycle should be a "data burst" or DATA. However, if a "data burst" or DATA is not transmitted, but a PLCW, in the next cycle, pre-filter 115 detect this as an illegal combination. Thus, pre-filter 115 may use Table II to determine the appropriate legal combination. When the "current" input is a PLCW and the "next" input is PLCW, according to Table II, pre-filter 115 may mask the output of the illegal combination to an "idle control word" or IC. The invention may mask the illegal combination to an idle control word, because this condition satisfies one of the acceptable data path format described above. According to the pre-determined data path described above, the interval between the end of a given transfer and the next payload control word, which marks the start of another transfer or cycle, may include an idle control word. Therefore, pre-filter 115 masks the output to an idle control word since it is a legal condition for an idle control word to follow a payload control before the next cycle begins.

Based upon the pre-defined operating parameters, the invention may automatically generate in advance or dynamically a key or table of acceptable legal output combinations. The invention may automatically generate in advance a key or table of legal output combinations in order to determine how to mask an illegal combination when such an illegal combination arrives within system 100. For example, a key or table may be generated in advance or dynamically so that, when one "payload control" or PLCW occurs within an illegal combination of the 64-bits data, the output of legal combinations may be selected from one of the following patterns:
(PCLW, DATA, X, X), (X, PCLW, DATA, X), (X, X, PLCW, DATA), (X, X, X, PLCW)

As discussed above, based upon the classification of, for example, the next input, the current input and the previous input, the invention automatically selects the correct output combination.

Another example provides that the legal output combinations may be pre-determined in a situation where two "PLCW" arrives within an illegal combination of a 64-bits data signal. In this case, the legal output combination path may be selected from one of the following patterns:
(PLCW, DATA, PLCW, DATA), (X, PLCW, DATA, PLCW)

Thus, by generating a key or table in advance or dynamically of legal combinations and masking all illegal combinations, fewer logical combinations are transmitted to state machine 107 within data alignment circuit 120. Thus, the design of data alignment circuit 120 may be simplified.

Figure 7:
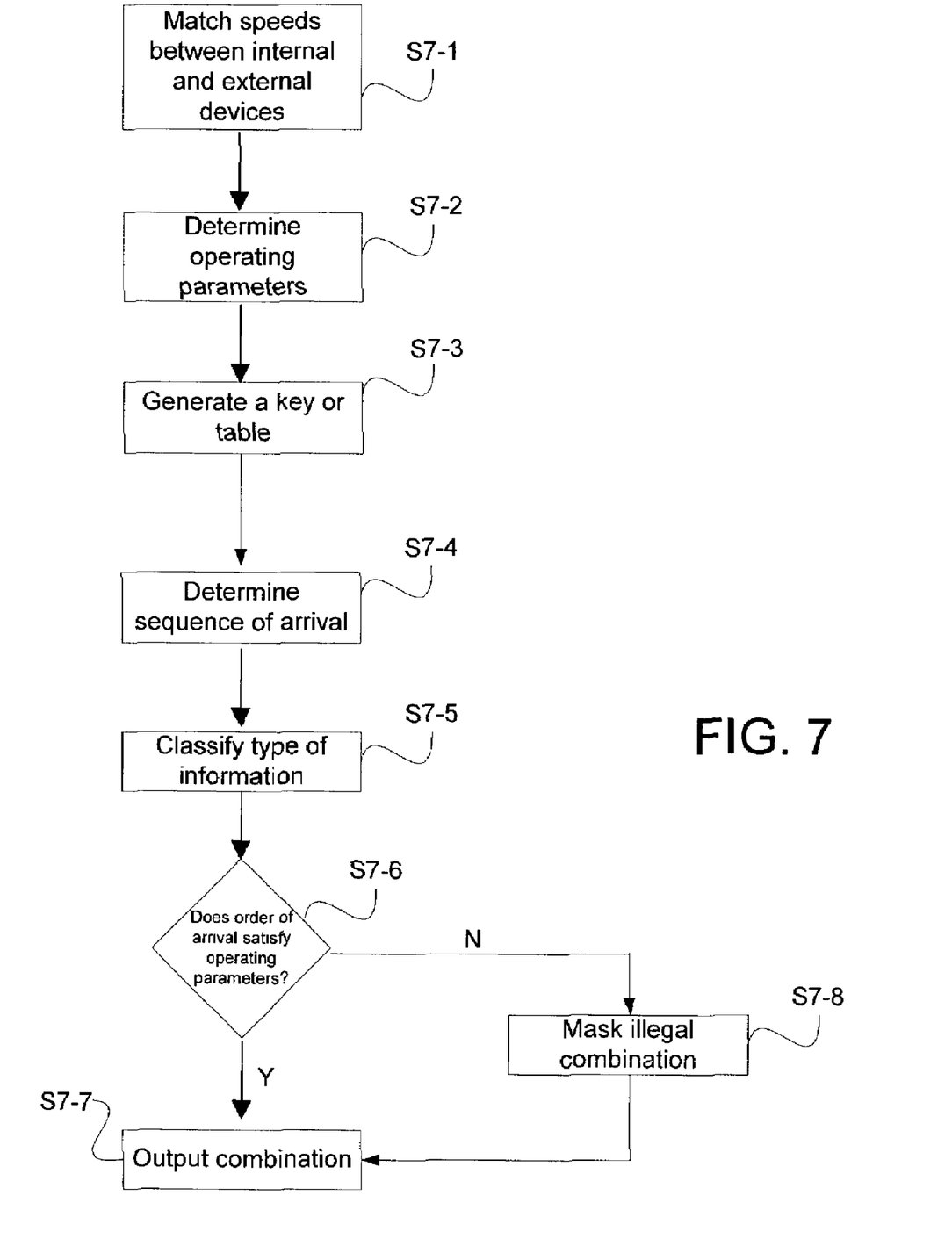
FIG. 7 is a flowchart of a method for detecting and filtering illegal combinations according to an embodiment of the invention.

FIG. 7 is a flowchart of a method for detecting and filtering illegal combinations according to an embodiment of the invention. At Step S7-1, the method compensates for the mismatch between a fast and slower device by adjusting the bus width. At Step S7-2, the operating parameters for the systems are determined. The operating parameters of the systems may be pre-programmed by a system operator or dynamically determined. The operating parameters may be mapped according to a state diagram. In Step S7-3, the system may generate a key or table of legal output combinations based upon the operating parameters. In Step S7-4, a data stream is received at a device within the system, and the sequence of the arrival of the type of information within the data stream is determined. In Step S7-5, the sequence of arrival may be determined by detecting the classification of the type of information transmitted within the data stream. The invention may detect the type of information transmitted within the current input, the previous input and/or the next input.

In Step S7-6, a pre-filter may check to determine whether the order of arrival satisfies the operating parameters. If in Step S7-6, the order of arrival does satisfy the operating parameters, the system advances to Step S7-7 and the bits within the data stream are transmitted to a data alignment circuit for further processing.

If in Step S7-6, the order of arrival or data path format does not meet the operating parameters, the system advances to Step S7-8. In Step S7-8, based upon the classification of the current input, next input and/or previous input, the system may use the key or table of legal output combinations to mask the illegal combination to a legal combination. The system then advances to Step S7-7 and outputs the legal combination to a data alignment circuit.

One aspect of the invention is that based upon the pre-determined parameters of the system and incoming data stream, the invention generates a key or table of legal combinations. If an illegal combination arrives within internal device 105, pre-filter 115 removes the illegal combination and maps the illegal combination to a pre-defined acceptable legal combination. Thus, the invention reduces the number of computations that are transmitted to data alignment circuit 120, which inherently simplifies the design of the data alignment circuit.

One having ordinary skill in the art will readily understand that the steps of the method may be performed in different order, or with multiple steps in parallel with one another. Also, one having ordinary skill in the art will understand that a network device may be configured to perform the above-described method either in silicon or in software. Accordingly, one will understand that the switching configurations described herein are merely exemplary. Accordingly, although the invention has been described based upon these preferred embodiments, it would be apparent to those of skill in the art that certain modifications, variations, and alternative constructions would be apparent, while remaining within the spirit and scope of the invention.

In order to determine the metes and bounds of the invention, therefore, reference should be made to the appended claims.

We claim:

1. A network component within a network entity, wherein said network component comprising:
    a port configured to send and receive a data stream having a first transfer rate, wherein the port is connected to said network entity;
    a synchronization module connected to said port and configured to synchronize said first transfer rate and a second transfer rate;
    a pre-filtering module connected to said synchronization module and configured to mask a non-compliant input within said data stream into a compliant output; and
    a data alignment module connected to said pre-filtering module and configured to perform logic computations on said compliant output.

2. The network component as recited in claim 1, wherein said pre-filtering module is configured to monitor a sequence of arrival of at least one or more bits within said data stream.

3. The network component as recited in claim 2, wherein said pre-filtering module is configured to determine a classification of said at least one or more bits within said data stream.

4. The system as recited in claim 3, wherein said pre-filtering module is configured to determine operating parameters established to transfer said data stream between said network entity and a network device.

5. The system as recited in claim 4, wherein said pre-filtering module is configured to determine whether said sequence of arrival satisfies said operating parameters.

6. The system as recited in claim 5, wherein said pre-filtering module is configured to search a look-up table to determine said compliant output when said sequence of arrival fails to meet said operating parameters.

7. The system as recited in claim 6, wherein said pre-filtering module is configured to determine whether said sequence of arrival satisfies said operating parameters, wherein said operating parameters are defined according to a state machine diagram.

8. A network component within a network entity, wherein said network component comprising:
    a port configured to send and receive a data stream having a first transfer rate, wherein the port is connected to said network entity;
    a synchronization means connected to said port and for synchronizing said first transfer rate and a second transfer rate;
    a pre-filtering means connected to said synchronization module and for masking a non-compliant input within said data stream into a compliant output; and
    a data alignment means connected to said pre-filtering means and for performing logic computations on said compliant output.

9. The system as recited in claim 8, wherein said pre-filtering means comprises a monitoring means for monitoring a sequence of arrival of at least one or more bits within said data stream.

10. The system as recited in claim 9, wherein said pre-filtering means comprises a classification means for determining a classification of said at least one or more bits within said data stream.

11. The system as recited in claim 10, wherein said pre-filtering means comprises a determination means for determining operating parameters established to transfer said data stream between said network entity and a network device.

12. The system as recited in claim 11, wherein said pre-filtering means comprises a sequence of arrival detection means for determining a sequence of arrival of bits within said data stream; and
    wherein said sequence of arrival detection means determines whether said sequence of arrival satisfies said operating parameters.

13. The system as recited in claim 12, wherein said pre-filtering means comprises a searching means for searching a look-up table to determine said compliant output when said sequence of arrival fails to meet said operating parameters.

14. A method for filtering non-compliant logic combinations within a system, said method comprising:
    interfacing a first device having a first transfer rate and a second device having a second transfer rate;
    transferring a data stream from said first device to said second device;
    synchronizing said first transfer rate and said second transfer rate;
    masking a non-compliant input within said data stream into a compliant output; and
    performing logic computations on said compliant output.

15. The method as recited in claim 14, further comprising the step of:
    monitoring a sequence of arrival of at least one or more bits within said data stream.

16. The method as recited in claim 15, further comprising the step of:
    classifying said at least one or more bits within said data stream.

17. The method as recited in claim 16, further comprising the steps of:
    determining operating parameters established to transfer said data stream between said first device and said second device.

18. The method as recited in claim 17, wherein the step of determining determines whether said sequence of arrival satisfies said operating parameters.

19. The method as recited in claim 18, the step of masking searches a look-up table to determine said compliant output when said sequence of arrival fails to satisfy said operating parameters.

20. The method as recited in claim 19, wherein the determining step comparing said sequence of arrival to states defined within a state machine diagram to determine whether said sequence of arrival satisfies said operating parameters.

* * * * *